United States Patent [19]

Falkenstein et al.

[11] 4,277,571

[45] Jul. 7, 1981

[54] URETHANE GROUP-CONTAINING POLYISOCYANURATE FOAM BASED ON NAPHTHENIC ACID-HYDROXYLAMINE ADDUCT

[75] Inventors: Georg Falkenstein, Neustadt; Hansjuergen Kessler, Mannheim, both of Fed. Rep. of Germany

[73] Assignee: BASF Aktiengesellschaft, Ludwigshafen, Fed. Rep. of Germany

[21] Appl. No.: 135,587

[22] Filed: Mar. 21, 1980

[30] Foreign Application Priority Data

Apr. 17, 1979 [DE] Fed. Rep. of Germany ....... 2915468

[51] Int. Cl.³ ..................... C08G 18/14; C08G 18/32
[52] U.S. Cl. ...................................... 521/164; 521/99; 521/130; 521/167; 521/902
[58] Field of Search ................. 521/164, 167, 130, 99, 521/902

[56] References Cited

FOREIGN PATENT DOCUMENTS 1173643 7/1964 Fed. Rep. of Germany .
343635 2/1960 Switzerland .
882949 11/1961 United Kingdom .
1248919 10/1971 United Kingdom .

OTHER PUBLICATIONS

Condensed Chemical Dictionary, 5th Ed. Reinhold N.Y. (1956) p. 754.

Primary Examiner—H. S. Cockeram
Attorney, Agent, or Firm—H. Lawrence Jones; Joseph D. Michaels

[57] ABSTRACT

This invention relates to an urethane group containing polyisocyanurate foam produced from a polyisocyanate and a polyhydroxy compound, wherein the polyhydroxy compound is the reaction mixture of a hydroxyl group containing amine which is at least difunctional and is selected from the group consisting of a secondary amine, a tertiary amine, and a mixture thereof, and a naphthenic acid, or a mixture of said reaction mixture and a conventional polyol, the reaction conditions are a temperature between 0° C. and 150° C. and an amino equivalent to carboxylic equivalent of 0.3:1 to 50:1.

10 Claims, No Drawings

URETHANE GROUP-CONTAINING POLYISOCYANURATE FOAM BASED ON NAPHTHENIC ACID-HYDROXYLAMINE ADDUCT

BACKGROUND OF THE INVENTION

1. Field of the Invention

This invention relates to a process of making an urethane group-containing polyisocyanurate foam from a polyisocyanate and a polyhydroxy compound wherein the polyhydroxy compound is an acid, neutral, or basic salt, or a mixture thereof of naphthenic acid and a hydroxyl group-containing amine selected from the group consisting of a secondary amine, a tertiary amine and a mixture thereof; or a mixture of the aforementioned salts and conventional polyols.

2. Description of the Prior Art

The manufacture of semi-rigid and rigid polyurethane foams from polyols, particularly polyfunctional polyether polyols, organic polyisocyanates, catalysts, blowing agents and auxiliaries and additives is described in detail in the appropriate literature (*Plastics Handbook*, Vol. VII, "Polyurethanes" by R. Vieweg and A. Hoechtlen, Carl Hanser Publishers, Munich, 1966).

Swiss Pat. No. 343,635 relates to the use of salts of secondary or tertiary amines which may contain hydroxyl groups in bonded form and monocarboxylic acid, polycarboxylic acids, sulfonic acids, or acid sulfuric ester as initiators for the manufacture of polyurethane foam in quantities of 1 weight percent to 10 weight percent relative to the polyhydroxy compound. When hydroxyl group-containing salts are used, the hydroxyl groups are masked prior to the urethane reaction by addition or condensation reaction.

Fatty acids, fatty acid esters, fatty acid amides or salts of fatty acids may also be used for making of polyurethane foam. German Patent Application No. 1,173,643 relates to the manufacture of flexible foams with the hand desired for textile processing and a velvet-like surface structure from toluene diisocyanate, a special polyester polyol, and a particular blowing agent mixture in the presence of 1 weight percent to 10 weight percent, relative to the polyester polyol, of tall oil. British Pat. No. 882,949 relates to making foams from natural water-containing salts of hydroxy fatty acids such as hydroxy stearic acid, resinoleic acid, and castor oils, and secondary and tertiary amines. British Pat. No. 1,248,919 relates to making foams from amides of fatty acids having 8 to 24 carbon atoms and dialkanol amines which also may contain salts of dialkanol amines and fatty acids as well as fatty acid esters. The salts themselves form extremely brittle foams which frequently collapsed. U.S. Pat. No. 3,178,300 relates to producing polyurethane foams with a skeletal structure of cell webs instead of cell walls from polyisocyanates and castor oil in the presence of monoalcohols having 1 carbon atom to 18 carbon atoms or of monocarboxylic acids having 2 carbon atoms to 18 carbon atoms.

A drawback of the above mentioned foams, particularly those based on tall oils, is that they usually have a very unpleasant odor. Furthermore, polyurethane foams containing high amounts of natural materials have somewhat less favorable compression strength characteristics than products containing synthetic polyols only.

The area of application of such foams is limited by their burning characteristics in relation to classification of construction materials. This drawback may be eliminated by adding fire protection agents in larger quantities. These include antimony oxide, chlorinated compounds such as the Diels-Alder adduct of hexahalogencyclopentadiene and maleic anhydride or of halogenated phosphorus compounds such as tris(2-chloroethyl)phosphate, tris(dichloropropyl)phosphate, or tris(2,3-dibromopropyl)phosphate.

However, the problem is only partially solved by these measures because the achieved flame resistance results in a considerable reduction of other physical properties such as compression strength and dimensional stability under influence of heat. Furthermore, this measure is expensive.

The manufacture of urethane group-containing polyisocyanurate foams is not new either.

Such polymer foams have a comparatively high dimensional stability under influence of heat and improved flame resistance. However, polyisocyanate foams are very brittle. The brittleness can be reduced by increasing the polyol content. A drawback of this, however, is that the flame-inhibiting properties are reduced thereby.

SUMMARY OF THE INVENTION

The purpose of this invention is to utilize naphthenic acid which is a product of crude oil. It is a further object to use the extremely cheap naphthenic acid as a polyol component for the manufacture of an urethane group-containing polyisocyanurate foam with the commonly used polyols being totally or partially replaced by naphthenic acid, its derivatives, or salts.

DESCRIPTION OF THE PREFERRED EMBODIMENTS

In order to eliminate the above-mentioned drawbacks an urethane group-containing polyisocyanurate foam is produced from an organic polyisocyanate, a polyhydroxy compound, a blowing agent, a catalyst, an auxiliary and an additive, wherein the polyhydroxy compound is an acid, neutral or basic salt, or a mixture thereof of naphthenic acid and an hydroxyl group-containing amine selected from the group consisting of a secondary amine, a tertiary amine and a mixture thereof.

The drawbacks are also eliminated by producing an urethane group-containing polyisocyanurate foam from an organic polyisocyanate, a polyhydroxy compound, a blowing agent, a catalyst, an auxiliary and an additive wherein the polyhydroxy compound is a mixture of a commonly used polyol and an acid, neutral or basic salt, or a mixture thereof, or naphthenic acid and a hydroxyl group containing amine selected from the group consisting of a secondary amine, a tertiary amine and a mixture thereof.

Although naphthenic acid has a characteristic odor, the urethane group-containing polyisocyanurate foam of this invention is surprisingly nearly odorless. Because the composition of the naphthenic acid from aliphatic, mono and bicyclic saturated monofunctional carboxylic acids vary depending upon the country of origin, it is surprising that the reaction of the above-mentioned salt with an organic polyisocyanate results in polyisocyanurate foams having good physical properties. It was particularly surprising that the foams of this invention have good physical properties in regard to compression strength, dimensional stability under influence of heat and classification of construction materials. The last is an indication of the burning characteristics of the foam.

As already described, an acid, neutral and/or preferably basic salt or a mixture thereof, of hydroxyl group-containing secondary or tertiary amines or a mixture thereof and naphthenic acid is used as a polyhydroxy compound for the manufacture of the polyisocyanurate foam of this invention. The definition "acid, neutral or basic salt" in this case is to be understood as an excess of acid in the case of an acid salt, an excess of base in the case of a basic salt and that the components are represented in an equivalent quantity ratio in the case of a neutral salt. The definition is not intended to indicate the acidity of the salts. Basic salts are preferably used.

The hydroxyl group-containing amine selected from the group containing a secondary amine, a tertiary amine and a mixture thereof of this invention used for the formation of naphthenic salts, must be at least difunctional. To be taken into consideration is an amine or mixture of amines containing at least one secondary amino group and at least one hydroxyl group in bonded form or an amine or mixture of amines having at least one tertiary amino group, at least one hydroxyl group, and if only one hydroxyl group is present, additionally at least one more radical with a hydrogen atom reactive with isocyanates such as a SH-, NH- and/or $NH_2$ groups. Also suited is an amine which, in addition to at least one hydroxyl group, have a secondary and tertiary amino group in bonded form, or a mixture of hydroxyl group-containing secondary and tertiary amines. A secondary amine includes N-alkylalkanolamines with 1 to 4 carbon atoms in the alkyl radical and 2 to 5 carbon atoms in the alkanolamine radical such as N-methylethanolamine, N-butylethanolamine, N-methylpropanolamine, N-ethylpropanolamine; and dialkanolamines such as diethanolamine, diisopropanolamine, and N-ethanol-N-isopropanolamine. A tertiary amine includes N-alkyldialkanolamines with 1 to 4 carbon atoms in the alkyl radical such as N-methyldiethanolamine, N-methyl diisopropanolamine, N-ethyl diethanolamine, N-ethyl diisopropanolamine, and N-butyl diethanolamine; trialkanolamines such as triethanolamine, triisopropanolamine; N,N,N',N'-tetrakis(2-hydroxyethyl)ethylenediamine, N,N,N',N'-tetrakis(2-hydroxypropyl)ethylenediamine, N,N,N',N'',N''-pentakis(2-hydroxyethyl)diethylenetriamine, as well as secondary and/or tertiary amino group-containing condensation products of aliphatic polyamines with 2 to 12, preferably 2 to 6, carbon atoms in the aliphatic radical such as ethylene diamine, 1,4-butylenediamine, and 1,6-hexanediamine and alkylene oxides, for instance, ethylene oxide and propylene oxide and their mixtures, having molecular weights of 75 to 800, preferably of 80 to 600, and secondary and/or tertiary amino group-containing polyester polyols as they are described below. The hydroxyl group-containing secondary or tertiary amine may be used as such or in the form of mixtures. Preferably used is a dialkanolamine or a mixture of dialkanolamines, particularly diethanolamine; a trialkanolamine or mixture thereof, particularly triethanolamines; N,N,N',N'-tetrakis(beta-hydroxypropyl)ethylenediamine, N,N,N',N',N''-pentakis(beta-hydroxyethyl)diethylenetriamine; a secondary or tertiary amino group-containing condensation product or a mixture thereof of an aliphatic diamine or mixture thereof and ethylene oxide or propylene oxide or a mixture thereof and a secondary or tertiary amino group-containing polyester polyol or mixture thereof, particularly from an aliphatic dicarboxylic acid or acids and isopropanolamine mixture or mixtures.

Naphthenic acid, in the sense of this invention, is an admixture having the general formula $C_nH_{2n-1}COOH$ and $C_nH_{2n-3}COOH$ which are found in crude oil. They are normally produced by extraction with alkali and acidification of the alkaline solution in form of a brown to black viscous product and usually still contain certain parts of neutral oils. Naphthenic acid is saturated, cyclic and carboxylic which, depending upon the origin of the crude oil, contain more or less linear aliphatic carboxylic acids having the formula $C_nH_{2n+1}COOH$. In the case of the naphthenic acid, monocyclic carboxylic acids of the formula $C_nH_{2n-1}COOH$ are differentiated from bicyclic carboxylic acids having the formula $C_nH_{2n-3}COOH$. The monocyclic carboxylic acids begin with the simplest naphthenic acid, the cyclopentane carboxylic acids, and increase to compounds having 20 carbon atoms. These are nearly always mixed with carboxylic acids of the bicyclic series, $C_nH_{2n-3}COOH$ ($n \geq 12$). The naphthenic acid may be purified by means of familiar processes. Appropriate processes are described, for instance, in the monograph "Naphthenic Acids and Naphthenates" by W. F. Maass, E. Buchspiess-Paulentz and F. Stinsky, publishers for *Chemical Industry* H. Ziolkowsky KG, Augsburg, 1961. Suitable for the process of this invention is distilled naphthenic acid as well as the chief technical qualities. Preferably used is commercially available, technical grade naphthenic acid.

The naphthenic acid useful in this invention has acid numbers from 60 to 350, preferably of 90 to 280, and densities at 15° C. of 0.92 gram per cubic centimeter to 1.00 gram per cubic centimeter, preferably of 0.96 gram per cubic centimeter to 0.995 gram per cubic centimeter.

For the production of the acid, neutral or basic salt, or a mixture thereof, of naphthenic acid and a hydroxyl group-containing amine selected from the group containing a secondary amine, a tertiary amine and a mixture thereof, the hydroxyl group-containing amine selected from the group consisting of a secondary amine, a tertiary amine and a mixture thereof, and the naphthenic acid are brought to reaction at a temperature of 0° C. to 150° C., preferably 10° C. to 100° C., in such quantity that 0.3 equivalent to 50 equivalents, preferably 0.5 equivalent to 30 equivalents, and in particular 0.8 equivalent to 10 equivalents, of secondary and/or tertiary amino group from the hydroxyl group-containing amine is present per carboxylic equivalent of the naphthenic acid. The carboxylic equivalent of the naphthenic acid includes the sum of equivalents of each component of a mixture of naphthenic acids of differing acid number. Under the specified reaction conditions, the salt of the initial component is preferably formed. However, it has been found that the formation of naphthenic acid amides or esters or mixtures thereof in a secondary quantity does not negatively influence the process of this invention.

For the production of the urethane group containing polyisocyanurates foam, the described acid, neutral or preferably basic salt, or a mixture thereof, of naphthenic acid and a hydroxyl group containing amine selected from the group containing a secondary amine, a tertiary amine and a mixture thereof may be used exclusively as the polyhydroxy compound. For the production of a foam with specific physical properties tailored to the respective area of application, however, it is often recommended that the naphthenic salt be mixed with commonly used polyols. Particularly well proven and, therefore, preferably used is a mixture of commonly used polyols and naphthenic acid salts as follows:

(a) 1 weight percent to 90 weight percent, preferably 5 weight percent to 70 weight percent, of an acid, neutral or basic salt, or a mixture thereof, of naphthenic acid and a hydroxyl group-containing amine selected from the group consisting of a secondary amine, a tertiary amine and a mixture thereof, and (b) 99 weight percent to 10 weight percent, preferably 95 weight percent to 30 weight percent, of a polyether polyol, polyester polyol, or a mixture thereof, with the weight percent being relative to the total weight of the mixture of the polyol and the naphthenic acid salt.

Commonly used polyols, in the sense of the invention, include polyester polyols, and particularly, polyether polyols. However, other hydroxyl group-containing polymers with 200 molecular weight to 6000 molecular weight, for example, polyacetals such as polyoxymethylene, polyester amides and polycarbonates, and particularly those produced by transesterification of diphenyl carbonate with hexanediol-1,6, may also be used.

Suitable polyester polyols may be produced from dicarboxylic acids, preferably aliphatic dicarboxylic acids, with 2 carbon atoms to 12 carbon atoms, preferably 4 carbon atoms to 8 carbon atoms in the aliphatic radical, and multifunctional alcohols. Examples include aliphatic dicarboxylic acids such as glutaric acid, pimelic acid, suberic acid, azelaic acid, sebacic acid, undecanedioic acid, and preferably, succinic acid and adipic acid; and aromatic dicarboxylic acids such as phthalic acid, terephthalic acid, and tetrahydrophthalic acid. Examples of bi- and multifunctional alcohols include: ethylene glycol, diethylene glycol, 1,2- or 1,3-propanediol, dipropylene glycol, 1,4-butanediol, 1,6-hexanediol, 1,10-decanediol, trimethylolpropane, glycerine, pentaerythritol, and sucrose. Preferably used are ethylene glycol, propylene glycol and glycerine.

Particularly well suited are polyesters polyols which are produced by polycondensation of a dicarboxylic acid mixture which, relative of the total weight of the dicarboxylic acids, contains 20 weight percent to 35 weight percent, preferably 28 weight percent to 33 weight percent, succinic acid; 35 weight percent to 50 weight percent, preferably 40 weight percent to 45 weight percent, of glutaric acid; and 20 weight percent to 30 weight percent, preferably 24 weight percent to 28 weight percent, of adipic acid with multi-functional alcohols such as ethylene glycol, diethylene glycol, propylene glycol, glycerine and trimethylolpropane or preferably, with an isopropanolamine mixture.

In addition to the above-mentioned dicarboxylic acids, the dicarboxylic acid mixture may contain up to 5 weight percent, preferably 2 weight percent to 3 weight percent, relative to the total weight of impurities which primarily consist of imides of succinic and glutaric acid. Dicarboxylic acid mixtures may be produced as by-products during the manufacture of adipic acid by the oxidation of cyclohexanol or cyclohexanone with nitric acid.

Possible isopropanolamine mixtures include those which contain 5 weight percent to 40 weight percent, preferably 15 weight percent to 25 weight percent, of diisopropanolamine, and 95 weight percent to 60 weight percent, preferably 85 weight percent to 75 weight percent, triisopropanolamine relative to the total weight of the di- and triisopropanolamine, with the isopropanolamine mixture possibly containing up to a maximum of 8 weight percent, preferably up to 3 weight percent, relative to the total weight, secondary product. The isopropanolamine mixtures contain hydrogen atoms corresponding to a hydroxyl number of 830 mg KOH/g to 950 mg KOH/g, preferably of 860 mg KOH/g to 920 mg KOH/g which react with phthalic anhydride.

Corresponding isopropanolamine mixtures may, for instance, be manufactured as by-products in the manufacture of diisopropanolamine from ammonia or isopropanolamine and propylene oxide.

The polyester polyols which have 200 molecular weight to 4000 molecular weight, preferably 300 molecular weight to 1500 molecular weight, and from 40 hydroxyl number to 880 hydroxyl number, preferably from 150 hydroxyl number to 600 hydroxyl number, may be used individually or as mixtures with the acid, neutral or basic naphthenic acid salt or salts.

The polyether polyols are produced according to familiar processes from one or more alkylene oxide with 2 to 4 carbon atoms in the alkylene radical and an initiator molecule which contains 2 to 8 active hydrogen atoms in bonded form. Suitable alkylene oxides include tetrahydrofuran, epoxy propane, 1,2- or 2,3-butylene oxide, styrene oxide, and preferably, ethylene oxide, and 1,2-propylene oxide. The alkylene oxides can be used individually, alternatingly in sequence, or as mixtures. Suitable initiator molecules include: water, dicarboxylic acids such as succinic acid, adipic acid, phthalic acid, and terephthalic acid, mono- and dialkyl-substituted diamines with 1 carbon atom to 4 carbon atoms in the alkyl radical, such as ethylenediamine, 1,2- or 1,3-propylenediamine, 1,4-butylenediamine, 1,6-hexanediamine, 4,4'-, 2,4'- and 2,2'-diaminodiphenylmethane, triamines such as diethylene triamine, alkyl-substituted dialkanolamines with 1 to 4 carbon atoms in the alkyl radical such as diethanolamine, diisopropanolamine, N-methyl and N-ethyldiethanolamine, trialkanolamines such as triethanolamine and triisopropanolamine, and preferably, multifunctional alcohols such as ethylene glycol, 1,2- and/or 1,3-propylene glycol, diethylene glycol, dipropylene glycol, 1,4-butanediol, 1,6-hexanediol, glycerine, trimethylolpropane, trimethylolethane, pentaerythritol, sorbitol and sucrose. Preferably used are ethylene glycol, propylene glycols, glycerine, sorbitol and sucrose. The polyether polyols may be used individually or as mixtures with each other and with the above-described polyester polyols together with the naphthenic acid salts.

It may be appropriate to use additional cross-linking agents for the manufacture of the polyisocyanurate foam in addition to the salts of naphthenic acid, or mixtures of the naphthenic salts with common polyols. Possibly cross-linking agents include polyfunctional, particularly di- to tetrafunctional, compounds with 18 molecular weight to below 600 molecular weight, preferably of 60 molecular weight to 400 molecular weight. Suitable, for instance, are bi- and/or tri-functional alcohols such as ethylene glycol, propylene glycol, 1,4-butanediol, 1,6-hexanediol, glycerine, di(betahydroxyethyl)hydroquinone, diamines such as ethylenediamine, 3,3'- and/or 3,3', 5,5'-tetraalkyl-substituted 4,4'-diaminodiphenylmethane having 1 to 4 carbon atoms in the alkyl radical, 3,3'-dichloro-4,4'-diaminodiphenylmethane, and alkanolamines such as diethanolamine and triethanolamine.

Suited for the manufacture of an urethane group-containing polyisocyanurate foam are organic polyisocyanate having the formula R(NCO)$_n$ wherein R represents a multi-functional aliphatic alkylaromatic or aromatic organic radical, or mixed radicals of this type, and n stands for a whole number the value of which corresponds with the valency of R and is at least 2. Typical organic polyisocyanate or organic polyisocyanates for the purposes of this invention include aromatic polyisocyanates such as 2,4- and 2,6-toluene diisocyanates, 2,2'-, 2,4'-, 4,4'-diphenylmethane diisocyanates, triphenyl triisocyanates, biphenyl diisocyanates, m- or p-phenylene diisocyanates and 1,5-naphthylene diisocyanate and aliphatic polyisocyanates such as isophorone diisocyanates and hexane diisocyanates. Preferably used are the crude and pure toluene diisocyanates and mixtures of 2,2'-, 2,4'- and 4,4'-diphenylmethane diisocyanates, and polyphenyl polymethylene polyisocyanates (crude MDI). The polyisocyanate or polyisocyanates may be used individually or as mixtures.

For the manufacture of the urethane group-containing polyisocyanurate foam, the polyisocyanate and naphthenic acid salt or salts of this invention, or mixtures of naphthenic acid salt or salts and commonly used polyol or polyols and/or cross-linking agents, are brought to reaction in such quantity ratios that 1.1 isocyanate groups to 10 isocyanate groups, preferably 1.7 isocyanate groups to 6 isocyanate groups are present in the reaction mixture per hydroxyl group or the sum of hydroxyl groups and other Zerewitinoff-active hydrogen atoms.

The blowing agent used includes water, which reacts with isocyanate groups to form carbon dioxide. The water quantities which are appropriately used are 0.2 weight percent to 4 weight percent, preferably 1 weight percent to 3 weight percent, relative to the weight percent of the polyhydroxy compounds.

Other applicable blowing agents which are preferably used are low-boiling liquids which evaporate under the influence of the exothermal polymerization and/or polyaddition reaction.

Suitable are those liquids which are inert against the organic polyisocyanates and have boiling points of not more than 100° C. at atmospheric pressure, preferably between −40° C. and +50° C. Examples are halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling liquids and/or other substituted or unsubstituted hydrocarbons may also be used.

The most appropriate amount of low-boiling liquid for the manufacture of foam depends upon the intended foam density as well as the use of water. In general, quantities of 5 weight percent to 40 weight percent relative to 100 weight percent of polyhydroxy compound provide satisfactory results.

The acid, neutral or basic salt, or a mixture thereof, of naphthenic acid and a hydroxyl group containing amine selected from the group consisting of a secondary amine, a tertiary amine and a mixture thereof may have a foam stabilizing effect which also influences the appearance of the foam and the pore structure so that an auxiliary and an additive used for this purpose may be either completely or partially eliminated for the manufacture of polyisocyanurate foam. Usually, however, surface-active substances may also be used for the reaction. Other auxiliaries and additives may also be used, such as catalysts, plasticizers, flame retardants, hydrolysis protection agents, substances with fungistatic and bacteriostatic effects, colors, pigments and fillers.

Catalysts for the cyclization and polymerization of isocyanates are known. Examples include: strong bases such as quaternary ammonium hydroxides, for instance, benzyltrimethyl ammonium hydroxide; alkali metal hydroxides such as sodium or potassium hydroxide; alkali metal alkoxides such as sodium methylate and potassium isopropylate; trialkyl phosphines such as triethylphosphine; alkylaminolkyl phenols such as 2,4,6-tris-(dimethylaminomethyl)-phenol, 3- and/or 4-substituted pyridines for instance 3- or 4-methylpyridine; metal organic salts such as tetrakis-(hydroxyethyl)-sodium borate; Friedel-Crafts catalysts such as aluminum chloride, ferric (III) chloride, borofluoride and zinc chloride, and alkali metal salts of weak organic acids and nitrophenolates such as potassium formate, potassium octoate, potassium-2-ethyl-hexoate, potassium benzoate, sodium picrate, and phthalimide potassium. Preferably used are the strongly basic N,N',N''-tris-(dialkylaminoalkyl)-s-hexahydrotriazines such as the N,N',N''-tris-(dimethylaminopropyl)-s-hexahydrotriazine, potassium octoate, potassium formate, sodium- and potassium hydroxide individually or as mixtures.

In many cases, it is advantageous to use compounds which catalyze the polyurethane formation from polyols and polyisocyanates in addition to the referenced cyclization and polymerization catalysts. Suitable for this purpose are tertiary amines such as dimethylbenzoamine, dicyclohexylmethylamine, dimethylcyclohexylamine, N-methyl- or N-ethylmorpholine, dimethylpiperazine, pyridine, 1-azo-bicyclo-(3,3,0)-octane, dimethylaminoethanol, 1,2-dimethylimidazole and triethylenediamine, and metal salts such as ferrous chloride, zinc chloride and preferably, stannous salt and dibutyltin dilaurate. In order to achieve favorable reaction periods, the amount of the selected catalysts and/or the catalyst mixture used is determined emperically as a function of the activity. In general, it has proven to be appropriate to use 0.5 part by weight to 10 parts by weight of a cyclization and/or polymerization catalyst or catalyst mixture and possibly 0.3 part by weight to 5 parts by weight, preferably 0.8 part by weight to 3 parts by weight, of a polyurethane catalyst for 100 parts by weight of polyhydroxy compound.

It is also possible to use surface-active materials which support the homogenization of the starting materials and which also regulate the cell structure of the foams. Examples include siloxane-oxyalkylene-mixed polymers and other organopolysiloxanes, oxyethylated alkylphenols, oxyethylated fatty alcohols, paraffin oils, castor oil or resinoleic acid ester and Turkish red oil to be used in quantities of 0.2 part by weight to 6 parts by weight per 100 parts by weight of polyhydroxy compound.

It may also be advantageous to incorporate a plasticizer in the reaction mixture so that the tendency toward brittleness in the product is reduced. Commonly used plasticizing agents may be used but it is especially appropriate to use those agents which contain phosphorus and/or halogen atoms and which thereby increase the fire resistance of the polyisocyanurate foams. Such agents include tricresol phosphate, tris(2-chloroethyl)-phosphate, tris(chloropropyl)phosphate and tris(2,3-dibromopropyl)phosphate.

In addition to the already-mentioned halogen-substituted phosphates, inorganic flame retardants may also be used. These include antimony trioxide, arsenic oxide, ammonium phosphate and calcium sulfate. 5 parts by weight to 50 parts by weight, preferably 5 parts by weight to 25 parts by weight, of flame retardant per 100 parts by weight of polyhydroxy compound are used.

More detailed data on the above-mentioned other commonly-used auxiliaries and additives are listed in the appropriate literature, for instance, in J. H. Saunders and K. C. Frisch "High Polymers", Volume XVI, Polyurethanes, Parts 1 and 2, Interscience Publishers, 1962 or 1964.

The isocyanate group containing polyisocyanurate foam is produced according to the prepolymer and preferably according to the one-spot process. For this purpose, the polyhydroxy compound or mixtures are mixed intensively with the polyisocyanate, catalyst, blowing agent, and possibly auxiliary and additive, in the stated quantities, at temperatures from 10° C. to 40° C., preferably 15° C. to 33° C. and the reaction mixture is then allowed to foam.

The urethane group-containing polyisocyanurate foam produced according to this invention has densities of 18 grams per liter to 60 grams per liter, preferably 20 grams per liter to 45 grams per liter, and have excellent physical properties. The product is preferably used as insulating materials, particularly in construction.

The parts referred to in the examples are parts by weight.

EXAMPLES 1 TO 20

Component A

For each example in the table the quantities of the starting components listed in columns 1 to 30 are mixed. The mixture, heated through the heat of neutralization, is cooled and mixed with the quantities of blowing agent in column 31.

In order to avoid loss of blowing agent, the mixture is cooled below the boiling point of the blowing agent. The heat of evaporation of the blowing agent can also be used for cooling. In this case, care must be taken that the amount of blowing agent listed in column 31 remains in the mixture.

Component B

Component B is a mixture of diphenylmethane diisocyanates and polyphenyl polymethylene polyisocyanates (crude MDI) in the quantity listed in column 32.

Components A and B are mixed intensively and the foamable mixture is poured into an open mold. If the mixing process takes place continuously, the mixing ratio must always correspond to the quantity ratio listed in the table. At temperatures of approximately 23° C., the mixture foams with the reaction times listed in the table. For measuring the physical properties listed in the table, samples are cut from the panel-like foam materials. The physical properties determined are the density according to DIN 53,420, the compression strength according to DIN 53,421, the dimensional stability under the influence of heat according to DIN 53,424, and the construction material classification according to DIN 5102, Part 1.

The starting components listed in the table are abbreviated as follows:

I: Polyether polyol, a propylene oxide adduct of ethylenediamine having a hydroxyl number of approximately 750 to 800

II: Polyether polyol, a propylene oxide adduct of ethylenediamine having a hydroxyl number of approximately 460 to 500

III: Polyester polyol from a dicarboxylic acid mixture, ethylene glycol and triisopropanolamine having a hydroxyl number of 300 to 360.

IV: Polyester polyol from a dicarboxylic acid mixture and triisopropanolamine having an OH number of 420 to 460.

V: Triethanolamine.

VI: Diethanolamine.

VII: Polyester polyol, a propylene oxide adduct of sucrose having a hydroxyl number of 380 to 420.

VIII: Polyether polyol, a propylene oxide adduct of sorbitol having a hydroxyl number of 390 to 430.

IX: Halogenated polyether polyol

X: Polyester polyol based on a dicarboxylic acid mixture, ethylene glycol, and multivalent alcohols with a hydroxyl number of 230 to 270.

XI: Water.

XII: Propylene glycol.

XIII: Ethylene glycol.

XIV: Naphthenic acid 1 (Acid number 90 to 105).

XV: Naphthenic acid 2 (Acid number 120 to 135).

XVI: Naphthenic acid 3 (Acid number 150 to 170).

XVII: Naphthenic acid 4 (Acid number 180 to 200).

XVIII: Naphthenic acid 5 (Acid number 210 to 230).

XIX: N,N′,N″-tris-(dimethylaminopropyl)-s-hexahydrotriazine.

XX: Potassium octoate.

XXI: Potassium formate.

XXII: Sodium hydroxide.

XXIII: Potassium hydroxide.

XXIV: Dimethylcyclohexylamine.

XXV: Foam stabilizer based on a polyether-modified polysiloxane (®Tegostab B 1903)

XXVI: Rigid foam stabilizer (DOW Corning Oil 193)

XXVII: A copolymer of a dimethylpolysiloxane and a polyoxyalkylene ether acting as a foam stabilizer (SF 1066)

XXVIII: Tris(2-chloroethyl)phosphate.

XXIX: Tris(chloropropyl)phosphate.

XXX: Tris(2,3-dibromopropyl)phosphate.

XXXI: Trichlorofluoromethane.

XXXII: Mixture of diphenylmethane diisocyanate and polyphenyl polymethylene polyisocyanate (crude MDI).

The following table shows the quantities in parts of the starting components used for each example of urethane group containing polyisocyanurate foam.

TABLE

| Example | I | II | III | IV | V | VI | VII | VIII | IX | X | XI | XII | XIII | XIV | XV | XVI | XVII | XVIII |
|---|---|---|---|---|---|---|---|---|---|---|---|---|---|---|---|---|---|---|
| 1 | 85 | | | | | | | | | | 2.8 | | | | | | 133 | |
| 2 | | 262 | | | | | | | | | | | | | | | 26 | |
| 3 | | | 167 | | | | | | | | 2.0 | | 18.3 | | | | | 59 |
| 4 | | | | 83 | | | | | | | | | | | | 168 | | |
| 5 | | | | | 18 | 172 | | | | | 2.6 | | | | | | 96 | |
| 6 | | 189 | | | | | | | | | | 2.1 | | 116 | | | | |
| 7 | | 215 | | | | | | | | | | | | | | | | 41 |

TABLE-continued

| Example | I | II | III | IV | V | VI | VII | VIII | IX | X | XI | XII | XIII | XIV | XV | XVI | XVII | XVIII |
|---|---|---|---|---|---|---|---|---|---|---|---|---|---|---|---|---|---|---|
| 8 | | | 188 | | | | | | | 1.3 | | 26 | | 39 | | | | |
| 9 | 58 | | | | | | 30 | 118 | 1.8 | | | | | | | 90 | | |
| 10 | 16 | | | | 16 | 161 | | | | | 4.2 | | | | | 129 | | |
| 11 | | | 89 | | | 147 | | | 1.5 | | | 42 | | | | | | 16 |
| 12 | | | | 94 | | | 27 | 109 | 1.6 | | | | | 43 | | | | |
| 13 | | | 248 | | | | | | 3.1 | | | 62 | | | | | | |
| 14 | | | | 67 | | 146 | | | | | 3.8 | | | | | 79 | | |
| 15 | 29 | | | | | | 38 | 138 | | | 3.3 | | | | | 46 | | |
| 16 | | | 148 | | | | | | | | | | | | | 20 | | 32 |
| 17 | 24 | 14 | | | | | 60 | 151 | | | | | | | | 53 | | |
| 18 | | | | 40 | 13 | | 38 | 141 | 3.8 | | | | | | | | | 24 |
| 19 | | | 268 | | | | | | | 4.2 | | | | | | 14 | | |
| 20 | | | 204 | | | | | | | 3.7 | | | 17 | 27 | | | | |

| | Starting Components | | | | | | | | | | | | | |
|---|---|---|---|---|---|---|---|---|---|---|---|---|---|---|
| Example | XIX | XX | XXI | XXII | XXIII | XXIV | XXV | XXVI | XXVII | XXVIII | XXIX | XXX | XXXI | XXXII |
| 1 | 6.5 | | 1.5 | | | 2.2 | 2.2 | | | 26 | | | 115 | 626 |
| 2 | 17 | | | | | | 2.9 | | | | 43 | | 130 | 519 |
| 3 | | | 3.7 | | | 9.8 | | 2.7 | | | | 22 | 100 | 615 |
| 4 | 5 | | | | | | 3.0 | | | | 43 | | 95 | 603 |
| 5 | | 5.1 | | | | 2.9 | 2.9 | | | 34 | | | 109 | 558 |
| 6 | 9.1 | | 0.9 | | | 6.1 | | | 2.7 | 24 | | | 101 | 549 |
| 7 | 18 | | | | | | | | 2.3 | | 46 | | 123 | 554 |
| 8 | 7.6 | 2.5 | | | | 7.6 | | 2.5 | | | | 51 | 106 | 569 |
| 9 | 12 | | | 1.8 | | | 2.7 | | | 35 | | | 118 | 532 |
| 10 | 6.5 | | 2.3 | | | 6.5 | | | 3.2 | 32 | | | 123 | 500 |
| 11 | 8.8 | | | | 1.5 | | 2.9 | | | | 44 | | 115 | 532 |
| 12 | 8.2 | 3.3 | | | | | | 2.5 | | 33 | | | 131 | 547 |
| 13 | | 6.2 | | | | 6.2 | 3.1 | | | | | 40 | 130 | 502 |
| 14 | 11 | | 2.0 | | | | 2.9 | | | | 29 | | 132 | 527 |
| 15 | 7.5 | | 1.8 | | | 2.5 | 2.5 | | | 30 | | | 125 | 576 |
| 16 | 6 | | | | | 4 | | 2.4 | | | | 20 | 126 | 641 |
| 17 | 12 | | | | | 6 | 3 | | | | | | 136 | 541 |
| 18 | | 7.7 | | | | 5.1 | | | 2.8 | | 51 | | 110 | 563 |
| 19 | | | | 4.2 | | 5.6 | | | 2.8 | | 20 | 20 | 85 | 576 |
| 20 | | | | | 3.7 | 5 | 2.2 | | | | | 25 | 62 | 650 |

| | Foam Times | | Rise Time sec. | Density g/l | Compression Strength h/Pa | Dimensional Stability Under Influence Of Heat °C. | Classificaton of Construction Materials units |
|---|---|---|---|---|---|---|---|
| Example | Cream Time sec. | Gel Time sec. | | | | | |
| 1 | 7 | 53 | 110 | 29.2 | 155 | 199 | B2 |
| 2 | 8 | 53 | 85 | 26.3 | 144 | 200 | B2 |
| 3 | 8 | 32 | 60 | 24.2 | 110 | 178 | B2 |
| 4 | 5 | 19 | 40 | 34.8 | 122 | 155 | B2 |
| 5 | 8 | 53 | 140 | — | — | — | — |
| 6 | 9 | 37 | 70 | 41.0 | 189 | 192 | B3 |
| 7 | 10 | 30 | 60 | 33.3 | 184 | 212 | B2 |
| 8 | 9 | 33 | 55 | 29.7 | 142 | 168 | B2 |
| 9 | 14 | 30 | 50 | 26.1 | 112 | 206 | B2 |
| 10 | 6 | 38 | 95 | — | — | — | — |
| 11 | 9 | 33 | 60 | 26.5 | 150 | 203 | B3 |
| 12 | 11 | 36 | 90 | 23.5 | 103 | 195 | B2 |
| 13 | 12 | 44 | 90 | 31.4 | 176 | 210 | B2 |
| 14 | 11 | 42 | 75 | 24.6 | 124 | 190 | B3 |
| 15 | 14 | 30 | 50 | 26.1 | 112 | 206 | B2 |
| 16 | 10 | 34 | 80 | 35.5 | 202 | 210 | B2 |
| 17 | 9 | 22 | 40 | 26.7 | 122 | 208 | B2 |
| 18 | 14 | 30 | 50 | 32.5 | 156 | 206 | B2 |
| 19 | 11 | 30 | 65 | 24.6 | 182 | 183 | B2 |
| 20 | 9 | 23 | 35 | 28.9 | 115 | 174 | B2 |

The embodiments of the invention in which an exclusive privilege or property is claimed are defined as follows:

1. A process of making a urethane-group containing polyisocyanurate foam from organic polyisocyanate, a polyhydroxy compound, a blowing agent, a catalyst, wherein the polyhydroxy compound is a reaction mixture of a hydroxyl group containing amine which is at least difunctional and is selected from the group consisting of a secondary amine, a tertiary amine and a mixture thereof, and a naphthenic acid, said reaction mixture brought to reaction at a temperature of 0° C. to 150° C. in such quantity that 0.3 equivalent to 50 equivalents of secondary and/or tertiary amino group from the hydroxyl group-containing amine is present per carboxylic equivalent of the naphthenic acid.

2. The process of claim 1 wherein the polyhydroxy compound is a mixture of a polyol and a reaction mixture of naphthenic acid and an hydroxyl group containing amine selected from the group consisting of a secondary amine, a tertiary amine and a mixture thereof.

3. The process of claim 2 wherein the mixture of polyol and the reaction mixture is
   (a) 1 weight percent to 90 weight percent of a reaction mixture of naphthenic acid and an hydroxyl group-containing amine selected from the group consisting of a secondary amine, a tertiary amine and a mixture thereof, and (b) 99 weight percent to 10 weight percent of a polyol with the weight percent being relative to the total weight of the mixture of polyol and the reaction mixture.

4. The process of claim 1 wherein the hydroxyl group-containing amine selected from the group consisting of a secondary amine, a tertiary amine, and a mixture thereof is reacted in the quantity of 0.5 equivalent to 30 equivalents of amine per carboxylic equivalent of the naphthenic acid.

5. The process of claim 1 wherein the hydroxyl group-containing amine selected from the group consisting of dialkanolamine, trialkanolamine, N,N,N',N'-tetrakis(2-hydroxypropyl)ethylenediamine, N,N,N',N'',N''-pentakis(2-hydroxyethyl)ethylenetriamine, low molecular weight secondary and tertiary amino group-containing condensation products of aliphatic polyamines having 2 carbon atoms to 12 carbon atoms and ethylene oxide, propylene oxide, or a mixture thereof.

6. The process of claim 1 wherein the hydroxyl containing-amine is selected from the group consisting of secondary amino group containing polyester polyols, tertiary group containing polyester polyols and a mixture thereof.

7. The process of claim 6 wherein the hydroxy containing-amine polyols, is a condensation product of an aliphatic dicarboxylic acid and isopropanolamine mixtures.

8. A urethane-group-containing polyisocyanurate foam produced from a polyisocyanate, a polyhydroxy compound, a blowing agent, and a catalyst, wherein the polyhydroxy compound is a reaction mixture of naphthenic acid and an hydroxyl-containing amine which is at least difunctional and is selected from the group consisting of a secondary amine, a tertiary amine, and a mixture thereof, said reaction mixture brought to reaction at the temperature of 0° C. to 150° C. in such quantity that 0.3 equivalent to 50 equivalents of secondary and/or tertiary amino group from the hydroxyl group-containing amine is present per carboxylic equivalent of the naphthenic acid.

9. The foam of claim 8 wherein the polyhydroxy compound is a mixture of a polyol and the reaction mixture of naphthenic acid and an hydroxyl containing amine which is at least difunctional and is selected from the group consisting of a secondary amine, a tertiary amine, and a mixture thereof, said reaction mixture brought to reaction at a temperature of 0° C. to 150° C. in such quantity that 0.3 equivalent to 50 equivalents of secondary and/or tertiary amino group from the hydroxyl group-containing amine is present per carboxylic equivalent of a naphthenic acid.

10. A urethane-group-containing polyisocyanurate foam produced from a polyisocyanate, a polyhydroxy compound, a blowing agent, a catalyst, an auxiliary and an additive wherein the polyhydroxy compound is a reaction mixture of naphthenic acid and a hydroxyl-containing amine which is at least difunctional and is selected from the group consisting of a secondary amine, a tertiary amine, and a mixture thereof, said reaction mixture brought to reaction at a temperature of 0° C. to 150° C. in such quantity that 0.3 equivalent to 50 equivalents of secondary and/or tertiary amino group from the hydroxyl group-containing amine is present per carboxylic equivalent of a naphthenic acid.

* * * * *